H. CARR.
Wheel Cultivator.
No. 100,499.            Patented March 8, 1870.
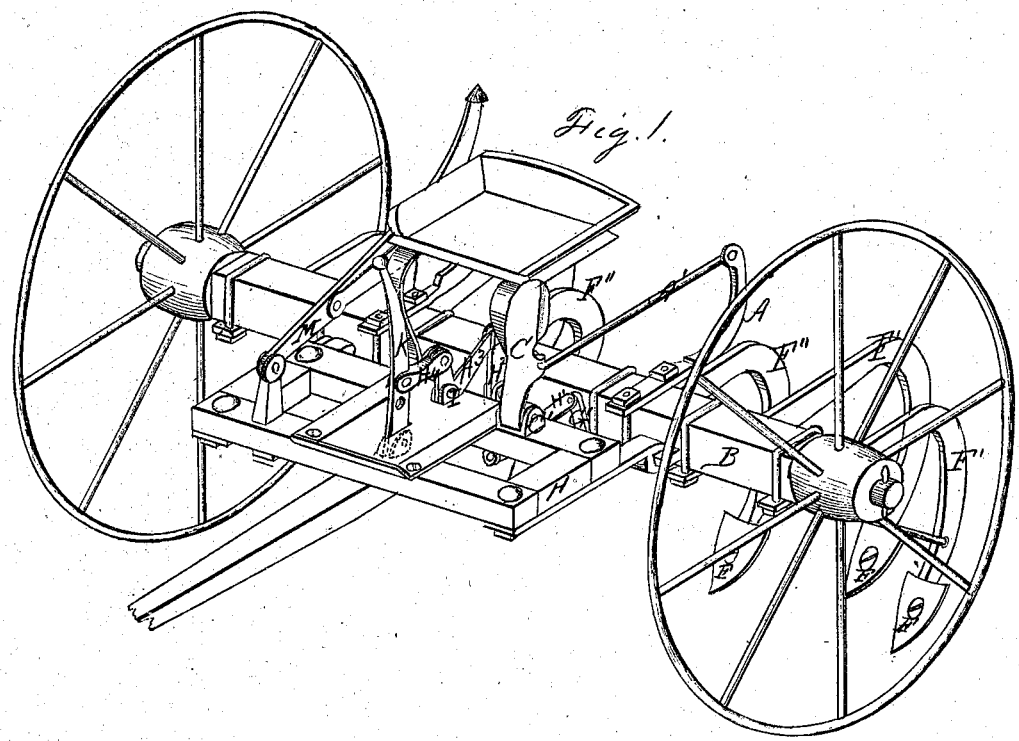
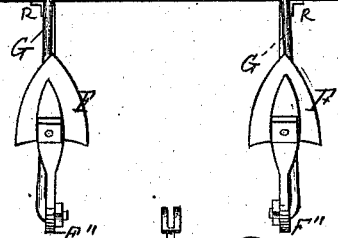
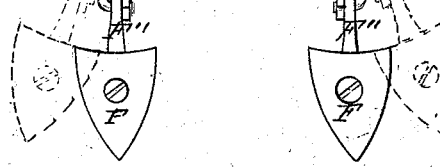

UNITED STATES PATENT OFFICE.

HORACE CARR, OF WOOSTER, OHIO.

IMPROVEMENT IN CULTIVATORS.

Specification forming part of Letters Patent No. 100,499, dated March 8, 1870.

*To all whom it may concern:*

Be it known that I, HORACE CARR, of Wooster, in the county of Wayne and State of Ohio, have invented certain new and useful Improvements in Cultivators; and I do hereby declare the following to be a full, clear, and exact description thereof, reference being had to the accompanying drawings, forming part of this specification, in which—

Figure 1 is a perspective view of cultivator having said improvements; Fig. 2, a section of axle, showing under side thereof and arrangement of movable shanks or beams; Fig. 3, a section of axle, showing front thereof and arrangement and operation of movable beams.

The cultivator which is the subject of said improvements is, in general construction, like that shown and described in the application of D. F. Carr, for which Letters Patent of the United States were granted June 8, 1869.

It consists of a two-wheeled cultivator the shovel-beams of which are secured to the axle, and has hinged to said axle a frame, H, supporting the driver's seat, and the forward end of a lever, M, which is also connected with the axle, so that by raising the lever the axle is turned in the wheels and the shovels raised from the ground.

A in the accompanying drawings shows an arm, the lower part of which is secured to the axle B. The upper end, curving upward in the manner clearly shown in Fig. 1, terminates in an eye, in which one end of a rod, A', is inserted.

C shows a foot-plate in an upright position, the lower end of which is pivoted to a suitable box or bracket, C', on the frame H, so as to allow the plate to swing forward or backward. To the side of said plate the forward end of the rod A' is attached. When the lever M is raised, the plate C is thrown forward till it touches or lies on the frame H, where it may be held by the pressure of the driver's foot, thus retaining the shovels above the ground. This device, for convenience, should be arranged on the side of the seat opposite the lever M. To prevent the driver's foot from slipping, the outer edge of the foot-plate may be turned up or flanged, as shown in Fig. 1.

The cultivator of D. F. Carr before mentioned, as shown in the drawings accompanying his application, has seven beams of equal distance apart, but is described as being better adapted to the cultivating of corn by removing the center beam.

The object of the present improvements hereinafter to be described is to the same end. The relative distance of the beams with their respective shovels is therefore substantially the same as in D. F. Carr's when the center beam is removed, so that three shovels cultivate on each side of the corn-row.

My improvement relates to the two middle beams, $F'' F''$. Instead of being rigidly secured to the axle, they are arranged to swing outward both at the same time, in the direction indicated by dotted lines in Fig. 3, to accommodate them to the varying width of the corn-rows. For this purpose the forward ends of said middle beams are rounded or journaled, and inserted in boxes D, secured to the under side of the axle. The braces G, reaching diagonally from the lower parts to the forward ends of said beams, are bent upward in front of the axle into lever-arms G', and are eyed and placed on the ends of the beams, as shown in Figs. 2 and 3. The beams and braces are held in position by nuts screwed on the beam ends. In lieu of the braces, the arms G' may be extensions of the forward ends of the beams.

H' are toggle-arms, which, slanting downward where they are pivoted together, connect the ends of the arms G'.

$H^2$ is an upright jointed arm, in the lower end of which the toggles H' work.

$H^3$ is an L-shaped link, arranged to work at its angular part on the frame H, to which a pin, I, is attached. One of the legs of said link connects with the upper end of the arm $H^2$ and the other with a horizontal link, $H^4$, which in turn is secured by a pin to an upright handle, K, the lower end of which is pivoted to the frame H, about the middle thereof, and the upper end of which rises within easy reach of the driver's hand. When the handle K is drawn back, the shovels are thrown outward and brought back to their places by pushing the handle forward. The object of having the arm $H^2$ in two linked parts is to allow the axle to turn easily.

R R are plates attached to the back part of the axle, and extending down outside the beams, and, being flanged or otherwise suitably formed, prevent the shovels being brought too closely together.

R' R' are pins inserted in the front part of the axle, to keep the shovels from being thrown too far apart, the arms G' resting against them when the requisite distance is attained, as shown in Fig. 3.

What I claim as my invention, and desire to secure by Letters Patent, is—

1. So constructing and arranging the two middle beams and shovels of a cross row or series of beams and shovels of a wheel-cultivator in combination with a suitable operating handle or lever that the points of said middle shovels may be turned outward from or inward toward each other simultaneously, as described, by a single direct movement of said operating handle or lever, for the purpose set forth.

2. The combination of the oscillating beams F" F", toggles H' H', arm H², either single or jointed, and operating-handle K, substantially as specified.

3. The combination and arrangement of the oscillating beams F" F", toggles H' H', arm H², either single or jointed, links H³ H⁴, handle K, and arms G' G', with and without the braces G, substantially as and for the purpose specified.

4. In combination with a turning beam-holder, B, forming the arm H² in two jointed parts, as and for the purpose set forth.

5. In combination with the turning axle or beam holder B, frame H, and lever M, the foot-plate C, rod A', and arm A, substantially as described.

6. The plates R R and pins R' R', as and for the purpose set forth.

7. Connecting the middle beams, F" F", when arranged to swing simultaneously in contrary directions on horizontal axes or bearings, by toggles H', as and for the purpose set forth.

HORACE CARR.

Attest:
DAVID ROBISON, Jr.,
JAMES C. JACOBS.